United States Patent [19]

Bier et al.

[11] Patent Number: 5,057,264

[45] Date of Patent: Oct. 15, 1991

[54] RAPIDLY CRYSTALLIZING POLYPHENYLENE SULPHIDE COMPOSITIONS

[75] Inventors: Peter Bier, Krefeld; Klaus Reinking, Wermelskirchen; Ludwig Bottenbruch; Ernhard Tresper, both of Krefeld, all of Fed. Rep. of Germany

[73] Assignee: Bayer Aktiengesellschaft, Leverkusen-Bayerwerk, Fed. Rep. of Germany

[21] Appl. No.: 390,494

[22] Filed: Aug. 1, 1989

Related U.S. Application Data

[63] Continuation of Ser. No. 172,638, Mar. 24, 1988, abandoned, which is a continuation of Ser. No. 894,680, Aug. 8, 1986, abandoned.

[30] Foreign Application Priority Data

Aug. 21, 1985 [DE] Fed. Rep. of Germany ....... 3529838

[51] Int. Cl.$^5$ ..................... C08F 265/04; B29C 45/00; B29C 35/12
[52] U.S. Cl. ................. 264/328.1; 525/311; 525/437; 525/537
[58] Field of Search ...................... 269/328.1; 524/280, 524/281, 285, 292, 299, 311, 609; 525/437, 537, 311

[56] References Cited

U.S. PATENT DOCUMENTS

| 4,276,397 | 6/1981 | Froix | 525/437 |
| 4,405,740 | 9/1983 | Davies | 524/299 |
| 4,413,083 | 11/1983 | Davies | 425/299 |
| 4,748,169 | 5/1988 | Izutsu et al. | 525/537 |

FOREIGN PATENT DOCUMENTS

| 0044184 | 1/1982 | European Pat. Off. |
| 55-135160 | 10/1980 | Japan | 525/437 |
| 8200152 | 1/1982 | World Int. Prop. O. |

OTHER PUBLICATIONS

"Patent Abstract of Japan", vol. 9, No. 59 (C-270) [1782], Mar. 15, 1985.

*Primary Examiner*—Robert A. Dawson
*Assistant Examiner*—Allan R. Kuhns
*Attorney, Agent, or Firm*—Connolly and Hutz

[57] ABSTRACT

Highly crystalline, rapidly crystallizing thermoplastic compositions containing:
 a) 70-99.5% by weight of a polyphenyl sulphide having a melt viscosity of at least 5 Pas (measured at 306° C. and at a shear stress of $10^2$ Pa) and
 b) 0.5-30% by weight, relative to a) and b) of an oligomeric ester having at least two repeating ester monomeric units and a maximum molecular weight, expressed as a number average, of 6000.

4 Claims, No Drawings

RAPIDLY CRYSTALLIZING POLYPHENYLENE SULPHIDE COMPOSITIONS

This application is a continuation of application Ser. No. 172,638, filed March 24, 1988, now abandoned which in turn is a continuation of application Ser. No. 894,680 filed Aug. 8, 1986, now abandoned.

The invention relates to highly crystalline, rapidly crystallizing, thermoplastic compositions consisting of polyphenylene sulphides and esterification products.

Polyphenylene sulphides can be used as raw materials for the production of fibres, films and shaped articles. By virtue of their partly crystalline structure, they possess excellent properties, for example high resistance to wear, advantageous creep rupture properties and high dimensional accuracy. They are therefore very suitable for the production of components exposed to considerable mechanical stress and high temperatures.

An additional improvement in their mechanical properties can be achieved by incorporating reinforcing material, for example glass fibres.

The production of moldings from polyphenylene sulphide by injection molding is rendered difficult, however, since high molding temperatures ($>130°$ C.) and relatively long molding times are required. Mold temperatures $>130°$ C. or higher cannot be put into practice by most injection molders, since the molds are normally designed for a temperature of about $100°$ C. (heating medium water). Mold devices which are operated by other heating media, for example oil, and achieve temperatures $>110°$ C. are rare, in general, and their use is inconvenient. In practice, the desired temperatures are very often not achieved thereby, and the temperature distribution is non-uniform. Because of this it is not attractive from an economic point of view to use such high mold temperatures in the injection molding field.

Furthermore, it is desirable to achieve a high degree of crystallinity as rapidly as possible in order to obtain an optimum level of properties. High crystallinity ensures hardness, dimensional stability and stability of shape, even at fairly high temperatures. In addition the duration of the injection molding cycle, which co-determines the profitability, depends on the demolding time.

Even at the high mold temperatures for processing polyphenylene sulphide, these cycles are relatively long and they make it difficult for polyphenylene sulphide to advance in the production of injection moldings.

It has now been found that polyphenylene sulphides possess a higher degree of crystallinity and crystallize more rapidly if they contain 0.5–30% by weight, relative to polyphenylene sulphide, of oligomeric carboxylic acid esters. This makes it possible to reach the degree of crystallinity required for the high stability of shape more rapidly and hence to process the polyphenylene sulphide compositions at greatly shortened injection molding cycle times.

A further advantage of the polyphenylene sulphide compositions according to the invention consists in reducing the mold temperature without impairing the good crystallization behaviour. The injection molding composition cools more rapidly, as a result of which the demolding time is shortened further.

The invention relates to highly crystalline, rapidly crystallizing thermoplastic compositions consisting of:

a) 70–99.5, preferably 90–98.5 and particularly preferentially 93–97, % by weight of a polyphenyl sulphide having a melt viscosity of at least 5 Pas (measured at $306°$ C. and at a shear stress of $10^2$ Pa and b) 0.5–30, preferably 1.5–10 and particularly preferentially 3–7, % by weight, relative to a) and b) of an oligomeric ester having a lower degree of polymerization of 2 and a maximum molecular weight which, expressed as a number average, should be 6000.

The invention also relates to a process for the preparation of highly crystalline, rapidly crystallizing thermoplastic compositions, characterized in that 70–99.5, preferably 90–98.5 and particularly preferentially 93–97, % by weight of a polyphenylene sulphide having a melt viscosity of at least 5 Pas ($306°$ C., $\tau = 10^2$ Pa), at least 50 Pas, and 0.5–30, preferably 1.5–10 and particularly preferentially 3–7, % by weight are mixed with an oligomeric polyester having a lower degree of polymerization of 2 and a maximum molecular weight, expressed as a number average, of 6000, by adding the oligomeric ester to the polyphenylene sulphide melt and homogenizing the former in the melt.

The invention also relates to a process for injection molding of compositions according to claim 1, characterized in that a mixture of a polyphenylene sulphide having a melt viscosity of at least 5 Pas (measured at $306°$ C. at a shear stress of $10^2$ Pa) and an oligomeric ester having a lower degree of polymerization of 2 and a maximum molecular weight, expressed as a number average, of 6000 is injected into molds having a temperature not higher than $120°$ C., the amount of oligomeric ester being so chosen that the injection molded polyphenylene sulphide component has a degree of crystallinity of at least 70% of that which is achieved when a component of unmodified polyphenylene sulphide is injection molded at mold temperatures of at least $130°$ C.

Polyarylene sulphides can be prepared in a known manner from dihalogeno aromatic compounds and alkali metal sulphides. They can have melt viscosities of 5 to $10^7$, preferably 50 to $10^5$, Pa.s (see for example, U.S. Pat. Specification 2,513,188).

Examples of dihalogenoaromatic compounds are p-dichlorobenzene, p-dibromobenzene, 1-chloro-4-bromobenzene, 1,3-dichlorobenzene, 1,3-dibromobenzene and 1-chloro-3-bromobenzene. They can be used on their own or as a mixture with one another. 1,4-Dichlorobenzene and/or 1,4-dibromobenzene are particularly preferred.

Further examples of dihalogenoaromatic compounds are 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,5-dichlorobenzene, 1-cyclohexyl-2,5-dichlorobenzene, 1-phenyl-2,5-dichlorobenzene, 1-benzyl-2,4-di-chlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene and 2,4-dichlorotoluene.

If branched polyarylene sulphides are to be prepared, at least 0.05 mol % of a trihalogenoaromatic or tetrahalogenoaromatic compound is employed additionally.

In order that the polyphenylene sulphides may remain processable as thermoplastics, the content of trihalogenoaromatic or tetrahalogenoaromatic compounds should not be more than 7 mol %, relative to the dihalogenobenzene employed.

The following are examples of trihalogenoaromatic and tetrahalogenoaromatic compounds: 1,2,3-trichlorobenzene, 1,2,4-trichlorobenzene, 1,2,4-tribromobenzene, 1,3,5-trichloro-2,4,5-trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4-tetrachlorobenzene, 2,2'-4,4'-tetrachlorobiphenyl and 1,3,5-trichlorotriazine.

Alkali sulphides are employed in customary amounts and in a customary manner. For example, sodium sulphide and potassium sulphide are suitable. It is possible to employ alkali sulphides which are regenerated from hydrogensulphides by means of alkali metal hydroxides, such as LiOH, NaOH and KOH. Mixtures of both the sulphides and the hydroxides can be employed in every case.

In general, any polar solvent which ensures adequate solubility of the organic and, if appropriate, inorganic reactants under the reaction conditions can be employed for the reaction. It is preferable to use N-alkyl lactams.

N-Alkyllactams are lactams of amino acids which have 3–11 C atoms and which can, if appropriate, carry substituents on the carbon skeleton which are inert under the reaction conditions.

For example, the following N-alkyl lactams are used: N-methylcaprolactam, N-ethylcaprolactam, N-isopropylcaprolactam, N-isobutylcaprolactam, N-propylcaprolactam, N-butylcaprolactam, N-cyclohexylcaprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isobutyl-2-piperidone, N-methyl-6-methyl-2-piperidone and N-methyl-3-ethyl-2-piperidone.

Mixtures of the above solvents can be chosen.

Additionally, the reaction can, if appropriate, be carried out in the presence of customary catalysts, for example alkali metal carboxylates (DE-AS (German Published Specification) 2,453,749), lithium halides or alkali metal carboxylates (DE-OS (German Published Specification) 2,523,362), lithium chloride or lithium carboxylate (DE-OS (German Published Specification) 2,623,363), alkali metal carbonates in combination with alkali metal carboxylates (U.S. Pat. Specification 4,038,259), lithium acetate (DE-OS (German Published Specification) 2,623,333), trialkali metal phosphates (DE-OS (German Published Specification) 2,930,710), trialkali metal phosphonates (DE-OS (German Published Specification) 2,930,797), alkali metal fluorides (DE-OS (German Published Specification) 3,019,732), alkali metal sulphonates (US Patent Specification 4,038,260), or lithium carbonate and lithium borate (U.S. Pat. Specification 4,030,518).

The compounds used as oligomeric polyesters should contain essentially the following structural units of the formula (I) or (II) or combinations thereof

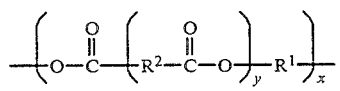

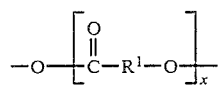

in which
- $R^1$, independently of one another, represents a linear or branched aliphatic, cycloaliphatic or araliphatic divalent radical having 2–20 C atoms, preferably 2–10 C atoms,
- $R^2$ represents a linear or branched aliphatic, cycloaliphatic, araliphatic or aromatic divalent radical having 2 to 20, preferably 3 to 10, C atoms,
- X represents a number from 2 to 60, so that the oligomer has a number average molecular weight of 6000 or less, and
- Y represents the number 0 or 1; if Y represents the number 0, the oligomer is an aliphatic polycarbonate, as a special type of a polyester.

It is also possible to use mixtures of the various compounds which fall under the formulae (I and II).

The oligomeric polyesters with the structural units of the formulae I and II can be prepared by esterifying or transesterifying dicarboxylic acids, anhydrides thereof and/or the corresponding dialkyl derivatives with aliphatic, cycloaliphatic or araliphatic alcohols. A detailed description of the various methods of preparation is given by H. Henecka et al. in Houben-Weyl, volume VIII, pages 359–680 (1952); by E. Müller in Houben-volume Weyl (1963), 1 et seq.; George Thieme Verlag, Stuttgart, 1963; and in V.V. Korshak and S.V. Vinogradova (Polesters), Pergamon Press, Oxford 1965, especially on pages 34–63.

Suitable polyesters can also be prepared by polymerizing cyclic esters, for example in accordance with U.S. Pat. Specifications 2,914,556, 2,977,385 and 3,892,821.

Preferred oligomeric polyesters with the structural units of the formulae I and II are those derived from the following divalent acids and alcohols, for example: dicarboxylic acids, such as adipic acid, phthalic acid, sebacic acid, glutaric acid and the like, and from dialcohols, such as butane-1,3-diol; butane-1,4-diol; propane-1,3-diol; propane-1,2-diol; ethylene glycol; diethylene glycol; triethylene glycol; hexane-1,6-diol; 2-ethylhexane-1,3-diol and the like.

The oligomeric polyesters can also contain certain monocarboxylic and tricarboxylic acids and also certain monohydric, dihydric and polyhydric alcohols, for example monocarboxylic acids, such as acetic acid, α-ethylhexanoic acid, lauric acid, stearic acid or benzoic acid, monoalcohols, such as isononyl alcohol, isodecyl alcohol, 3,5,5trimethylhexanol, 2-ethylhexanol, stearyl alcohol, butyl alcohol, methanol or benzyl alcohol, tricarboxylic acids, such as trimesic acid, trimellitic acid or citric acid, or polyhydric alcohols, such as glycerol, trimethylolpropane, pentaerythritol and the like.

Furthermore, suitable oligomeric polyesters can also be prepared from aliphatic carboxylic acids containing OH groups, such as, for example, ricinoleic acid, which undergo self-polymerization under suitable conditions.

In addition, the polyphenylene sulphide compositions can contain fillers and/or reinforcing materials in the form of powders, fibres or mats. Examples of these are metals, such as steel, copper or aluminium, or inorganic materials such as carbon, or aramides. Preferred fillers are quartz, talc, kaolin or Schäter chalk; preferred reinforcing materials are glass fibres.

The compositions can, if appropriate, also contain inorganic or organic pigments, dyestuffs, lubricants, mold release agents, UV absorbers or stabilizers.

In order to increase the flame resistance of the products further, they can contain, in addition, flameretardant additives such as, for example, additives which contain halogen, phosphorus or phosphorus-nitrogen, if appropriate in combination with oxides of the elements of the Vth subgroup, such as, for example, antimony oxide.

The crystallization rate of the polyphenylene sulphide compositions can be further increased by adding inorganic or organic nucleating agents.

This is carried out with the injection molding compositions in a standard manner. 0.05 to 5, preferably 0.1 to 1, % by weight of nucleating agents preferably microtalc, is added for this purpose.

The polyphenylene sulphide compositions according to the invention are excellent starting materials for the production of films and fibres, preferably for the production of shaped articles of all kinds, by injection molding.

EXAMPLES

The polyphenylene sulphide compositions according to the invention were prepared by mixing and homogenizing the base components (see Table 1) by means of a 30 mm Werner und Pfleiderer twin screw extruder at a melt temperature of 310° C. The ribbons were cut up into granules and dried overnight.

The isothermal rate of crystallization of the dried granules was determined using a DSC apparatus. The samples were given the following pretreatment: heated up to 330° C., kept at this temperature for 1 minute and chilled in liquid nitrogen. The amorphous samples were allowed to crystallize out isothermally at 110° C. in the DSC apparatus, and the change in the heat of crystallization was recorded as a function of the time (exothermic peak).

The time required to reach the maximum is recorded, as a half-life period, in Table 1 as a measure of the crystallization rate.

The samples, according to the invention, 1–11 listed in Table 1 consist of a polyphenylene sulphide having a melt viscosity of 50 Pas (measured at 306° C. and at a shear stress of 100 Pa), 5 % by weight of an oligomeric carboxylic acid ester and 1% by weight of microtalc. Example 12 is a corresponding sample of polyphenylene sulphide without an oligomeric carboxylic acid ester, as a comparison.

TABLE 1

| Example | Oligomeric carboxylic acid ester | $\overline{M}_n$ [g/mol] | End groups | Amount (% by weight) | Isothermal (110° C.) crystallization rate, half-life period [seconds] |
|---|---|---|---|---|---|
| 1 | Polytriethylene glycol phthalate | 1600 | -i-nonyl | 5 | 16 |
| 2 | Polyhexane-1,6-diol phthalate | 1800 | -i-decyl | 5 | 17 |
| 3 | Polyhexane-1,6-diol adipate | 1400 | 2-ethylhexyl | 5 | 15 |
| 4 | Polyhexanediol-1,6-adipate | 2000 | —OH | 5 | 17 |
| 5 | Polybutanediol-1,3-adipate | 1300 | —OH | 5 | 15 |
| 6 | Polybutanediol-1,4-adipate | 1900 | —OH | 5 | 18 |
| 7 | Polypropanediol-1,2-adipate | 2000 | 2-ethylhexyl | 5 | 18 |
| 8 | Polyethylene glycol adipate/phthalate (1/2) | 1000 | i-decyl | 5 | 18 |
| 9 | Polypropane-1,2-diol adipate/phthalate (3/1) | 2000 | OH | 5 | 18 |
| 10 | Polybutane-1,3-diol/hexane-1,6-diol (1/1) adipate | 2000 | OH | 5 | 18 |
| 11 | Polybutane-1,3-diol/butane-1,4-diol (1/1) adipate | 1900 | OH | 5 | 18 |
| 12 | — | — | — | — | 42 |

We claim:

1. Highly crystalline, rapidly crystallizing thermoplastic compositions consisting of
   a) 70–99.5% by weight of a polyphenylene sulphide having a melt viscosity of at least 5 Pas, measured at 306° C. and at a shear stress of $10^2$ Pa, and
   b) 0.5–30% by weight, relative to a) and b), of an oligomeric aliphatic ester having at least two recurring ester monomeric units and a maximum molecular weight, expressed as a number average, of 6000.

2. Compositions according to claim 1 wherein said oligomeric aliphatic ester (b) consists essentially of structural units of the formulae (I) or (II) or combinations thereof

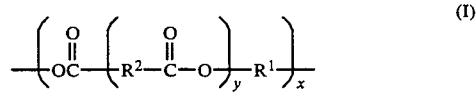

-continued

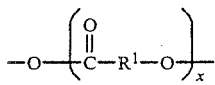
(II)

in which
- $R^1$, independently of one another, represents a linear or branched aliphatic or cycloaliphatic divalent radical having 2–20 carbon atoms,
- $R^2$ represents a linear or branched aliphatic or cycloaliphatic divalent radical having 2 to 20 carbon atoms,
- x represents a number from 2 to 60, so that the oligomer has a number average molecular weight of 6000 or less, and
- y represents the number 0 or 1.

3. Process for the preparation of highly crystalline rapidly crystallizing thermoplastic compositions wherein 70–99.5% by weight of a polyphenylene sulphide having a melt viscosity of at least 5 Pas, measured at 306° C. and at a shear stress of $10^2$ Pa, and 0.5–30% by weight of an oligomeric aliphatic ester having at least two recurring ester monomeric units and a maximum molecular weight, expressed as a number average, of 6000 are mixed with one another by adding the oligomeric aliphatic ester to the polyphenylene sulphide melt and homogenizing the former in the melt.

4. Process for injection molding highly crystalline rapidly crystallizing thermoplastic compositions wherein a mixture of a polyphenylene sulphide having a melt viscosity of at least 5 Pas, measured at 306° C. and at a shear stress of $10^2$ Pa, and an oligomeric aliphatic ester having at least two recurring ester monomeric units and a maximum molecular weight, expressed as a number average, of 6000 are injection molded into molds having a temperature not higher than 120° C., the amount of oligomeric aliphatic ester being so chosen that the injection molded polyphenylene sulphide component has at least 70% of the degree of crystallinity achieved when a component of unmodified polyphenylene sulphide is injection molded at mold temperatures of at least 130° C.

* * * * *